March 24, 1931. H. E. PLATT 1,797,618
PRESSURE OPERATED VALVE MECHANISM
Filed Aug. 23, 1930
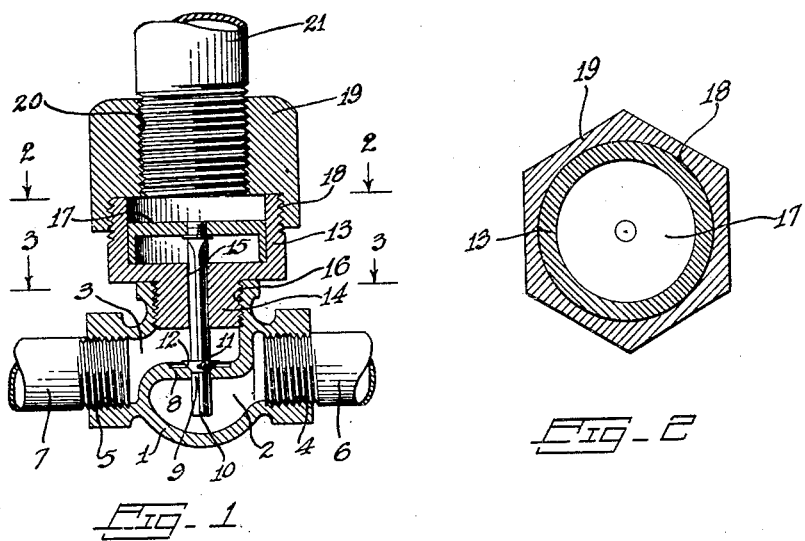
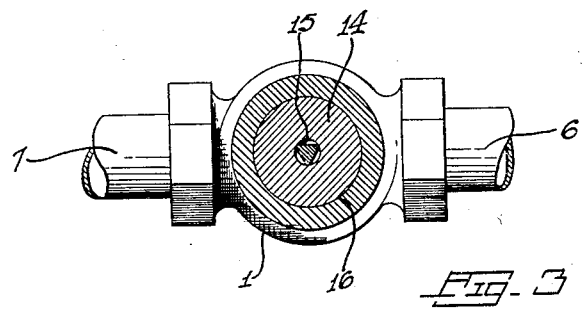
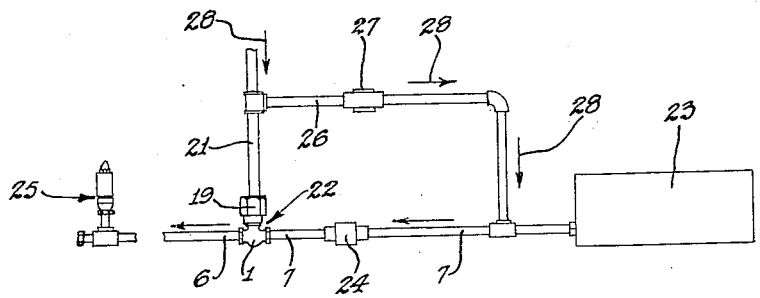
Harry E. Platt
INVENTOR
BY Munn & Co.
ATTORNEYS Patented Mar. 24, 1931

1,797,618

UNITED STATES PATENT OFFICE

HARRY E. PLATT, OF OTTUMWA, IOWA

PRESSURE-OPERATED VALVE MECHANISM

Application filed August 23, 1930. Serial No. 477,392.

My invention relates to improvements in pressure operated valve mechanisms, and it consists in the combinations, constructions, and arrangements herein described and claimed.

An object of my invention is to provide a pressure operated valve mechanism of the type associated with signaling devices and in which certain improvements are embodied over the structure disclosed in my copending application, Serial No. 451,144.

A further object is to provide a device of the type described in which means is provided whereby friction is reduced to a minimum, thereby providing a device which is relatively sensitive.

A further object is to provide a device of the type described in which the usual rubber diaphragm is entirely eliminated and in which few moving parts are necessary.

A further object is to provide a device of the type described which may be placed in various convenient locations within, let us say, the cab of a locomotive, and in which the device is constructed in such a manner that an efficient operation is attained, regardless of temperature changes, air currents, and the like.

A further object is to provide a device of the type described in which novel means is utilized whereby a fluid under compression may be controlled for signaling purposes or for establishing communication between individuals at various distances.

A further object is to provide a device of the type described in which the danger of accidental operation due to vibrations is entirely eliminated.

Other objects and advantages will appear in the following specification, and the novel features of the invention will be particularly pointed out in the appended claims.

My invention is illustrated in the accompanying drawings, forming part of this application, in which Figure 1 is a sectional view of my device, Figure 2 is a sectional view taken along the line 2—2 of Figure 1, Figure 3 is a sectional view taken along the line 3—3 of Figure 1, and Figure 4 is a diagrammatic view showing an installation embodying my invention.

In carrying out my invention, I make use of a body portion 1 provided with compartments 2 and 3 which communicate with openings 4 and 5, respectively. A pipe 6 may be secured within the opening 4 which is threaded for receiving the threaded end portion of the pipe while a pipe 7 may be similiarly secured within the threaded opening 5. The body portion 1 is provided with a partition 8 which establishes the compartments 2 and 3. The partition is provided with an opening 9 through which a stem 10 projects. The stem is provided with a valve 11 which is rigidly secured thereto. The valve normally lies in sealed engagement with a valve seat 12 associated with the opening 9. The lower portion of the stem 10 is triangular in cross section for a purpose which will be explained later.

A cylinder 13 is provided with a threaded extension 14 having an opening 15 therethrough. The threaded extension is secured within a threaded opening 16 in the body portion 1. The stem 10 passes through the opening 15 and is provided with a piston 17 which is disposed within the cylinder 13. The cylinder is provided with an exteriorly threaded portion 18 for receiving a connecting member 19. The latter is provided with a threaded opening 20 for receiving one end of a pipe 21. The piston 17 is of course firmly secured in an air-tight manner to the end of the stem 10 as is shown in Figure 1. The arrangement is such that the piston may be moved within the cylinder for lifting the valve 11 from its seat.

In Figure 4 I have shown diagrammatically an installation embodying my invention. The valve mechanism shown in Figure 1 is indicated at 22. The valve mechanism is associated with an auxiliary air tank 23 through the medium of the pipe 6. The pipe 7 is provided with an air strainer 24. Such strainers are well known in the art and therefore require no detailed description. The pipe 6 is connected with a whistle 25 which may be positioned in any desirable location within a cab of a locomotive. It will be understood, however, that while I have defined my invention as being used in connection with locomotives, the invention is equally applicable to other arts where signaling devices are employed.

The pipe 21 is associated with the signal pipe. This pipe is a separate line which extends throughout the entire train. The signal pipe functions as a conduit for air under pressure. The air for operating the signal apparatus is taken from the main reservoir of the locomotive. The pressure is ordinarily reduced to approximately forty pounds for signaling purposes. Such reduction is brought about through the medium of an air signal reducing valve. These valves are of course standard equipment and are therefore well known in the art.

A pipe 26 connects the pipe 21 with the pipe 7 and is provided with a check valve 27. The latter permits air to flow to the auxiliary reservoir 23 as indicated by the arrows 28, but prevents air from flowing from the reservoir in an opposite direction through the pipe 26. Check valves of this type are also well known in the art.

In operation, the whistle 25 may be caused to function by causing a discharge of air from the signal line. The discharge of the air is made through the medium of a discharge valve. Such discharge of air will cause an immediate reduction of pressure within the signal line. Under normal conditions, the air pressure throughout the signal line, the pipe 21, the pipe 26, the reservoir 23, and the pipe 7, will become equalized. At this time, the piston 17 is positioned as shown in Figure 1. The valve 11 is now disposed upon its seat so that the compartment 2 is sealed with respect to the compartment 3. When, however, a certain amount of air is discharged from the signal line, the pressure within this line is reduced. The piston is immediately moved for lifting the valve 11 from its seat. As soon as the pressure of the air within the signal line has been reduced, the air from the auxiliary reservoir 23 lifts the piston 17 by reason of the fact that this air is under a greater pressure than the reduced air pressure in the signal line. The air from the auxiliary tank has free access to the piston since the stem 10 is irregularly formed, as previously mentioned. As soon as the piston has been lifted sufficiently far to move the valve 11 from its seat, the air from the auxiliary tank will flow through the opening 8 and through the whistle 25 for operating the latter.

An important feature in connection with my invention is the fact that I have provided a valve mechanism in which the usual rubber diaphragm is entirely eliminated. The entire structure is formed from metal. Few moving parts are employed. The valve mechanism is constructed in such a manner that temperature variations, air currents and the like, do not influence the efficient operation of the apparatus. The invention embodies an additional important feature in that the whistle may be repeatedly operated at short intervals. Whenever the pressure in the signal line is reduced, the pressure in the auxiliary reservoir will of course be greater than the air pressure in the line. This differential pressure permits the whistle to be operated.

I claim:

1. A device of the type described having a connection with a main reservoir and comprising a valve mechanism having a connection with an auxiliary air reservoir, a connection with a signal line and a connection with a signaling device, said valve mechanism comprising in part a cylinder having piston means disposed therein, and means for placing the cylinder in communication with a signal line having air under pressure, whereby the piston means will be operated for releasing air from the auxiliary reservoir for operating the signaling device when the air pressure in the signal line is reduced, said piston means coacting with said cylinder to provide an air seal between said piston means and said cylinder.

2. A device of the type described having a connection with a signaling device and comprising a hollow body portion having a partition therein for providing a pair of compartments, said partition being provided with an opening, a cylinder associated with said body portion, a movable piston disposed within the cylinder and having a stem passing through the opening in said partition, and a valve carried by the stem and arranged for closing said opening, said movable piston and said cylinder coacting to provide an air seal between said piston and said cylinder, said stem being adapted to pass fluid between said stem and said valve.

3. A device of the type described comprising a valve mechanism having a connection with a main line reservoir, a connection with a signal line, a connection with an auxiliary air reservoir and a connection with a signaling device, said valve mechanism comprising in part a cylinder having piston means disposed therein, means for placing the cylinder in communication with a signal line having air under pressure, whereby the piston means will be operated for releasing air from the auxiliary reservoir for operating the signaling device when the air pressure in the signal line is reduced, and means for checking the flow of the air from the auxiliary reservoir to the signal line, said piston means coacting with said cylinder to provide a substantially air-tight air seal between said main reservoir connection and said connection with said signaling device.

4. A device of the type described comprising a valve mechanism having a connection with a main air reservoir, a connection with an auxiliary air reservoir and a connection with a signaling device, said valve mechanism comprising in part a cylinder having piston means disposed therein, means for placing the cylinder in communication with a signal line having air under pressure, whereby the piston means will be operated for releasing air from the auxiliary reservoir for operating the signaling device when the air pressure in the signal line is reduced, means for checking the flow of the air from the auxiliary reservoir to the signal line, and air straining means positioned between the auxiliary reservoir and the valve mechanism, said piston means and said cylinder coacting to provide a substantially air-tight air seal between said signal line and said signal device, one of said compartments having a connection with said signaling device forming the one exhaust opening of said compartment.

HARRY E. PLATT.